United States Patent Office 2,991,316
Patented July 4, 1961

2,991,316
PROCESS FOR THE PRODUCTION OF UNSATURATED HALOGEN COMPOUNDS
Hans Disselnkötter, Koln-Poll, and Peter Kurtz, Leverkusen-Bayerwerk, Germany, assignors to Farbenfabriken Bayer Aktiengesellschaft, Leverkusen, Germany, a corporation of Germany
No Drawing. Filed May 23, 1957, Ser. No. 661,002
Claims priority, application Germany June 25, 1956
2 Claims. (Cl. 260—654)

This invention relates to novel halogenated allyl-substituted proparyl alcohols, i.e., 1,2- and 1,3-dihalogen-hexa-2,5-dienes and to a process for their production.

It is known that hydrogen chloride can be added to propargyl alcohol in the presence of mercury compounds, the hydrogen chloride only being added across the triple bond (cf. German patent specification No. 764,595). It has now been found that propargyl alcohol which is substituted in the 3-position by an allyl radical, which can if desired itself be substituted e.g. by alkyl groups, can be reacted with hydrogen halides with the formation of the corresponding halogenated allyl-substituted compound, i.e., 1,2- and 1,3-dihalogen-hexa-2,5-dienes.

The substituted propargyl alcohols can be reacted with the hydrogen halides, for example hydrogen chloride and hydrogen bromide, in manner known per se by introducing the hydrogen halide into the propargyl alcohol in the presence or absence of a solvent.

Examples of propargyl alcohols which can be used for the process of the invention, are hex-5-ene-2-yne-1-ol, hept-5-ene-2-yne-1-ol or 4-methyl-hex-5-ene-2-yne-1-ol.

It is surprising that halogenated allyl-substituted propargyl alcohols, i.e., 1,2- and 1,3-dihalogen-hexa-2,5-dienes are obtained by the process of the invention while the double bond is not attacked. Furthermore, bearing in mind the data given in the German patent specification No. 764,595, it is surprising that the alcoholic group is also esterified when using hydrogen chloride. The compounds obtained by the process of the invention can be used as intermediates or as nematodicides.

The following examples further illustrate the invention without limiting it thereto.

Example 1

Hydrogen chloride was introduced into 25 grams of hex-5-ene-2-yne-1-ol at a temperature of 60–80° C. for about 17 hours. The reaction product was then taken up in 100 milliliters of methylene chloride, the aqueous phase was separated out and the product obtained was distilled in vacuo. There were obtained 15.1 grams of 1,2- and 1,3-dichlorohexadiene-2,5. B.P. 55° C. at 10 millimeters Hg, $n_D^{20}$: 1.4896.

Example 2

Hydrogen chloride was introduced into a solution of 1 gram of mercuric chloride in 93.3 grams of hex-5-ene-2-yne-1-ol preheated to 60° C., the hydrogen chloride being introduced until no more was absorbed. The temperature finally rose to 80° C. The reaction product was taken up in 300 milliliters of methylene chloride, the aqueous phase was separated out and dried over calcium chloride, and the product was distilled in vacuo. There were obtained 102.2 grams (=69.4%) of 1,2- and 1,3-dichlorohexadiene-2,5. B.P. 59° C.; $d_4^{20}$: 1.1156; $n_D^{20}$: 1.4898.

Example 3

100 grams of hept-5-ene-2-yne-1-ol were reacted as described in Example 2. The yield was 108.2 grams (=72%) of 1,2- and 1,3 - dichloroheptadiene - 2,5. B.P.$_{11}$=74° C.; $d_4^{20}$: 1.0853; $n_D^{20}$: 1.4912.

The efficacy of the dichlorohexadiene and the dichloroheptadiene was tested as follows:

The compounds were dispersed in water by adding 50% (referred to the active substance) of an emulsifier on the basis of a polyglycol ether of benzyl-p-hydroxy-diphenyl which contained 12–15 glycol radicals in the molecule. Aphelenchoides and meloidogyne were treated with this dispersion for 24 hours. Thereafter the following results were obtained:

| | Concentration | killed animals in percent | |
|---|---|---|---|
| | | Aphelenchoides | Meloidogyne |
| 1,2- and 1,3-dichlorohexadiene | 0.01 | 100 | 100 |
| | 0.005 | 50 | 90 |
| 1,2- and 1,3-dichloroheptadiene | 0.01 | 100 | 100 |
| | 0.005 | 90 | 95 |

Example 4

Hydrogen bromide was introduced into a suspension of 0.2 g. of red mercuric oxide in 20 grams of hex-5-ene-2-yne-1-ol preheated to 60° C., the hydrogen bromide being introduced until no more was absorbed. The temperature rose to 65° C. The reaction products were worked up by distillation and provided 19.4 grams of 1,2- and 1,3 - dibromohexadiene - 2,5. (B.P.$_{10mm}$=83.5–85.5° C.; $n_D^{20}$=1.5485.)

Example 5

Hydrogen chloride was introduced into a suspension of 1 gram of mercuric chloride in 100 grams of 4-methyl-hex-5-ene-2-yne-1-ol at a temperature of 80–100° C. for about 10 hours. The reaction product was taken up in 300 ml. of methylene chloride. The aqueous phase was separated and the product obtained distilled in vacuo. There were obtained 100 grams of 4-methyl-1,2- and 1,3-dichloro-hexadiene-2,5. B.P. 60–65° C. at 10 mm. Hg, $n_D^{20}$=1.4848.

We claim:

1. Process for the production of unsaturated halogen compounds which comprises reacting a compound of general formula

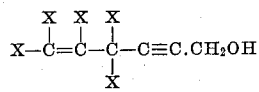

in which X is a member selected from the group consisting of hydrogen and methyl group, a hydrogen halide which is selected from the group consisting of hydrogen chloride and hydrogen bromide at a temperature between 60° and 100° C. and recovering the 1,2- and 1,3-dihalogen 2,5-dienes of formulas

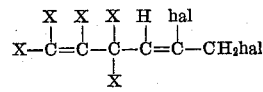

and

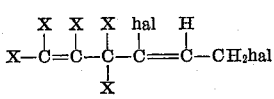

in which X has the same meaning as above, from the reaction mixture.

2. The process according to claim 1, in which the reaction is carried out in the presence of a catalyst, which is a member selected from the group consisting of mercuric oxide and mercuric chloride.

(References on following page)

References Cited in the file of this patent

UNITED STATES PATENTS

| | | |
|---|---|---|
| 1,972,887 | Greenewalt | Sept. 11, 1934 |
| 2,189,890 | Engs et al. | Feb. 13, 1940 |
| 2,281,096 | Engs et al. | Apr. 28, 1942 |
| 2,446,475 | Hearne et al. | Aug. 3, 1948 |
| 2,683,179 | Anspon | July 6, 1954 |
| 2,714,619 | Anderegg et al. | Aug. 2, 1955 |

FOREIGN PATENTS

| | | |
|---|---|---|
| 764,595 | Germany | Nov. 2, 1953 |

OTHER REFERENCES

Chemical Abstracts, vol. 44, column 7751(b), Sept. 10, 1950.

Chemical Abstracts, vol. 49, column 8783(a), July 10, 1955.

Schmid et al.: "Chemical Abstracts," vol. 40 (1946), page 46704.

Nazarou: Chemical Abstracts, vol. 49 (1955), page 6847F.